June 7, 1927.
G. W. SPONABLE
1,631,557
EXTERNAL BEARING ADJUSTING MEANS
Filed April 30, 1924
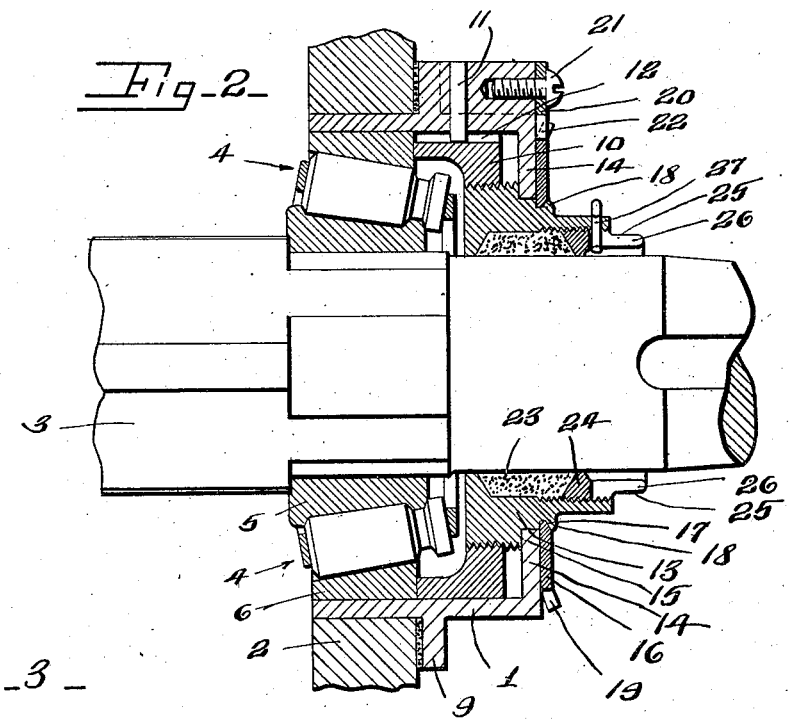
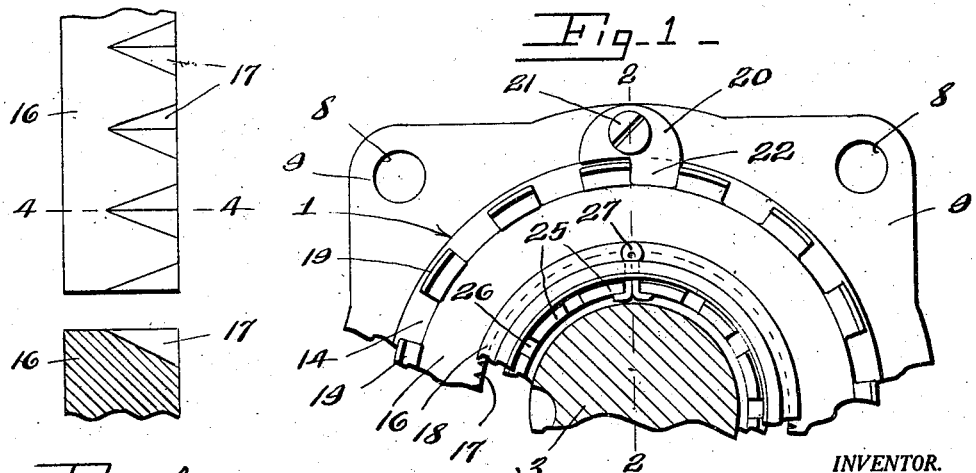
INVENTOR.
George W. Sponable
BY
Parsons & Bodell
ATTORNEYS.

Patented June 7, 1927.

1,631,557

UNITED STATES PATENT OFFICE.

GEORGE W. SPONABLE, OF SYRACUSE, NEW YORK, ASSIGNOR TO BROWN-LIPE GEAR COMPANY, OF SYRACUSE, NEW YORK, A CORPORATION OF NEW YORK.

EXTERNAL BEARING-ADJUSTING MEANS.

Application filed April 30, 1924. Serial No. 710,099.

This invention relates to bearing adjusting means, particularly applicable for adjusting the bearings of shafts of transmission gearing, such as are used in motor vehicles, and has for its object a bearing adjusting means, which is particularly simple and compact in construction, readily operable from the outside of the casing and highly efficient and durable in use.

The invention consists in the novel features and in the combinations and constructions hereinafter set forth and claimed.

In describing this invention, reference is had to the acompanying drawings in which like characters designate corresponding parts in all the views.

Figure 1 is a fragmentary elevation of this bearing adjusting means looking to the left in Fig. 2.

Figure 2 is a sectional view on line 2—2, Fig. 1.

Figure 3 is a greatly enlarged developed view of the inner edge of the ring or flange on the adjusting collar showing greatly magnified the fine teeth or indentations formed in such inner or annular edge.

Figure 4 is a fragmentary section on line 4—4, Fig. 3.

This bearing adjusting means comprises generally, in combination with a supporting element, a bearing carried by said element and a shaft element journalled in the bearing, the bearing including an adjustable part, of a threaded member arranged concentric with the axis of the bearing and thrusting against said part, means for holding said part from turning movement relatively to the element to which it is held by said means, a second threaded member engaging the first member and held from endwise movement, the second threaded member operating when turned to move the first threaded member axially and the second member being interlocked against axial movement with one of said elements, usually the supporting element, and having wrench or hand engaging means on the outer face of such supporting element.

I have here shown my bearing adjusting means as embodied in a transmission gearing, for adjusting the bearing of one of the shafts of the transmission gearing.

1 designates the supporting element which is here shown as a cup or cap carried by the wall 2 of a transmission gear casing, 3 is one of the shafts of the transmission gearing, it being usually the driven shaft, which is arranged in axial alinement with the driving shaft of the gearing, as will be understood by those skilled in the art. 4 designates the bearing supported in the cap 1 and in which the shaft 3 is journalled, this bearing being an antifriction conical bearing and comprising an inner ring 5 mounted on the shaft and rotatable therewith, an outer ring 6 mounted in the cap 1 and held from turning movement, these rings having opposed converging annular raceway faces and antifrictional members as conical rollers arranged between such faces. The face of the inner ring 5 is the bottom of a groove against the side walls of which the rollers thrust and, the outer ring 6 is adjustable axially to take up for looseness and wear and, owing to the fact that the bearing is conical, adjustment of the ring 6 axially also effects an adjustment of the bearing of the driving shaft in the opposite end wall of the case and of the bearing for the inner end of the shaft 3, as will be understood by those skilled in the art.

The cap 1 is secured to the wall 2 of the case in any suitable manner as by screws extending through the openings 8 in an external flange 9 on said support, which flange laps the outer face of the wall 2.

In the illustrated embodiment of my invention, the adjusting means comprises an internally threaded member or nut 10 arranged in the support 1 and movable axially thereof and held from turning movement by any suitable means as a pin or key 11 carried by the support and extending radially into a lengthwise groove 12 in the periphery of the nut, the nut thrusting against the outer edge of the outer ring 6.

The means for moving the nut 10 axially, that is, for adjusting the nut comprises a threaded member as a collar or ring 13 threading into the nut 10 and interlocking with the support 1 to be held from endwise movement and having means on the outside of the support by which said collar can be operated, said collar also encircling the shaft.

The support is also formed with a head or internal annular flange 14 and at its outer end is interlocked with the collar 13, the collar being formed with a shoulder 15 against which the inner side of the annular flange 14 abuts and also with the external annular flange 16 overlying the outer side of the flange or head 14 of the support, this flange and shoulder 15 forming an annular groove for receiving the head 14. The flange 16 and the collar 13 are provided with interlocking means by which the flange 16 is secured to the collar both against rotative and endwise movement and usually the flange is formed of sheet metal and provided with fine internal teeth or indentations around its inner margin and the collar 13 is formed with an annular part or head interlocked or imbedded in such teeth.

17 designates the fine teeth or indentations, these being shown as greatly enlarged in Figs. 3 and 4, Fig. 3 being a diagrammatic developed inner edge view of the ring. 18 designates the annular bead portion, which is interlocked with the teeth 17, it being so interlocked, usually by a spinning operation.

The flange 16 is formed with suitable means by which it may be turned, as suitable wrench engaging means as peripheral teeth 19, and the flange and consequently the collar 13 is normally held in its adjusted position from turning movement by a locking device 20 here shown as a detent secured to the support as by a screw 21 and having a tooth 22 insertable between any two of the teeth 19.

A suitable packing or gland 23 is located between the collar 13 and the shaft 3 and this packing is held in position by a plug or ring 24 threading into the collar 13 against the packing and having cylindrical lips 25 formed with a series of slots 26 for receiving a key 27 extending through a radial opening in the outer end of the collar 13 and into one of the notches 26. In order to tighten the packing, the key 27 may be removed and the packing plug 24 tightened.

After the collar 13 is mounted in the support 1 with its shoulder 15 abutting against the head or internal annular flange 14, the sheet metal flange 16 is secured in position, thus permanently interlocking the collar 13 with the support 1. The nut 10 is then inserted in the support with its groove 12 engaged with the pin 11 and the collar 13 turned to thread the nut on the collar.

In operation, when it is desired to adjust the bearing, the detent 20 is removed by loosening the screw 21, the collar 13 turned by engaging a suitable wrench or tool with the annular flange 16 of the collar 13, such turning causing the nut 10 to move axially and shift the outer bearing ring 6 and hence take up any looseness in the bearing or bearings.

This bearing adjusting means is particularly advantageous in that it is simple, compact in construction and readily operable, especially from the outside of the case.

What I claim is:

1. The combination of a support, a shaft and a bearing for the shaft carried by the support, the bearing including an axially adjustable part, an internally threaded nut thrusting against said part, means for holding the nut from relative turning movement and an adjusting member arranged concentric with the shaft and threading into the nut and operable upon turning to move the nut lengthwise of the shaft.

2. The combination of a support, a bearing in the support and a shaft journalled in the bearing, the bearing including an adjustable part, a nut arranged in the support concentric with the shaft and thrusting against said part, means connecting the support and the nut to hold the nut from turning movement, a collar arranged concentric with and mounted on the shaft and threading into the nut.

3. The combination of a support, a bearing in the support and a shaft journalled in the bearing, the bearing including an adjustable part, a nut arranged in the support concentric with the shaft and thrusting against said part, means connecting the support and the nut to hold the nut from turning movement, a collar arranged concentric with and mounted on the shaft and threading into the nut, the collar being interlocked with the support against endwise movement.

4. The combination of a support, a bearing in the support and a shaft journalled in the bearing, the bearing including an adjustable part, a nut arranged in the support concentric with the shaft and thrusting against said part, means connecting the support and the nut to hold the nut from turning movement, a collar arranged concentric with the shaft and threading into the nut, the collar support having an internal annular flange and the collar having a groove for receiving the annular flange and also having an external annular flange overlying the outer face of the first mentioned annular flange.

5. The combination of a support, a bearing in the support and a shaft journalled in the bearing, the bearing including an adjustable part, a nut arranged in the support concentric with the shaft and thrusting against said part, means connecting the support and the nut to hold the nut from turning movement, a collar arranged concentric with the shaft and threading into the nut, the collar support having an internal annular flange and the collar having a groove for receiving the annular flange and also having an external annular flange overlying the outer face of the first mentioned annular flange, the flange on the collar being provided with wrench engaging means.

6. The combination of a support, a bearing in the support and a shaft journalled in the bearing, the bearing including an adjustable part, a nut arranged in the support concentric with the shaft and thrusting against said part, means connecting the support and the nut to hold the nut from turning movement, a collar arranged concentric with the shaft and threading into the nut, the support being formed with an internal annular flange, the collar being formed with a shoulder for engaging the inner side of said flange and with an external annular flange abutting against the former annular flange, the external annular flange and on the collar being formed with interlocking means for holding the external flange and the collar against relative rotative movement and relative endwise movement.

7. The combination of a support, a bearing in the support and a shaft journalled in the bearing, the bearing including an adjustable part, a nut arranged in the support concentric with the shaft and thrusting against said part, means connecting the support and the nut to hold the nut from turning movement, and a collar arranged concentric with the shaft and threading into the nut, the support being formed with an internal annular flange formed with fine indentations or teeth in its inner edge adjacent the collar, and the collar having an annular portion interlocked in such indentations.

8. The combination of a support, a bearing in the support, a shaft journalled in the bearing and means for adjusting the bearing comprising a collar, the support being formed with an internal annular flange and the collar being formed with a shoulder abutting against the inner side of the flange and with an external inner flange overlying the outer face of the former annular flange.

9. The combination of a support, a bearing in the support, a shaft journalled in the bearing and means for adjusting the bearing comprising a collar, the support being formed with an internal annular flange and the collar being formed with a shoulder abutting against the inner side of the flange and with an external inner flange overlying the outer face of the former annular flange, the external flange being formed with a wrench hold.

10. The combination of a support, a bearing in the support, a shaft journalled in the bearing and means for adjusting the bearing comprising a collar, the support being formed with an internal annular flange and the collar being formed with a shoulder abutting against the inner side of the flange and with an external flange overlying the outer face of the former annular flange, the external flange and the collar being provided with interlocking means for securing the external flange to the collar and holding the collar and the flange from relative rotative movement.

11. The combination of a support, a bearing in the support, a shaft journalled in the bearing and means for adjusting the bearing comprising a collar, the support being formed with an internal annular flange and the collar being formed with a shoulder abutting against the inner side of the flange and with an external annular flange overlying the outer face of the former annular flange, the external flange being formed with fine indentations or teeth around its inner edge, and the collar having an annular part imbedded in such indentations or teeth.

In testimony whereof, I have hereunto signed my name, at Syracuse, in the county of Onondaga, and State of New York, this 29th day of April, 1924.

GEORGE W. SPONABLE.